(12) United States Patent
Singh et al.

(10) Patent No.: US 12,417,362 B1
(45) Date of Patent: Sep. 16, 2025

(54) DYNAMIC IMAGE BASED CONTACTLESS INSTRUCTIONS FOR AN ELECTRONIC MONITORING SYSTEM

(71) Applicant: Arlo Technologies, Inc., Carlsbad, CA (US)

(72) Inventors: Rajinder Singh, San Jose, CA (US); John Thomas, Carlsbad, CA (US); Manu Prasad Ramachandra Rao, Sunnyvale, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 18/912,857

(22) Filed: Oct. 11, 2024

(51) Int. Cl.
*G06K 1/12* (2006.01)
*G06K 1/14* (2006.01)

(52) U.S. Cl.
CPC .............. *G06K 1/12* (2013.01); *G06K 1/14* (2013.01)

(58) Field of Classification Search
None
See application file for complete search history.

(56) References Cited

U.S. PATENT DOCUMENTS

| | | | |
|---|---|---|---|
| 8,386,339 B2 | 2/2013 | Minnick et al. | |
| 10,460,221 B1 | 10/2019 | Tucker | |
| 10,510,232 B2 * | 12/2019 | Modestine | G08B 13/19608 |
| 11,068,682 B2 | 7/2021 | Chen | |
| 2012/0151293 A1 * | 6/2012 | Beals | G06K 7/1095 |
| | | | 714/755 |
| 2014/0131443 A1 * | 5/2014 | Smith | G06K 7/1404 |
| | | | 235/454 |
| 2018/0041339 A1 | 2/2018 | Lee | |

* cited by examiner

*Primary Examiner* — Kristy A Haupt
(74) *Attorney, Agent, or Firm* — Boyle Fredrickson, S.C.

(57) ABSTRACT

An electronic monitoring system for secure image code generation and a method of activating devices in the electronic monitoring system via the secure image codes are provided. The electronic monitoring system includes a base station in communication with a monitoring device. The monitoring device includes a camera to obtain images of a monitored area. A controller for the electronic monitoring system receives a request for a desired interaction with the electronic monitoring system from a first device and generates multiple image codes corresponding to the desired interaction. The controller transmits the image codes to a mobile device and then receives each of the image codes from the camera when the image codes are displayed on the mobile device while the mobile device is positioned in front of the camera. The controller activates the desired interaction with the electronic monitoring system responsive to receiving the image codes from the camera.

20 Claims, 6 Drawing Sheets

DYNAMIC IMAGE BASED CONTACTLESS INSTRUCTIONS FOR AN ELECTRONIC MONITORING SYSTEM

FIELD OF THE INVENTION

This invention relates generally to remotely providing instructions for electronic monitoring systems and, in particular, to an electronic monitoring system including a camera to scan an image, where the electronic monitoring system decodes data from the image to remotely activate and control devices connected to the electronic monitoring system.

BACKGROUND OF THE INVENTION

The Internet is a global system of interconnected computers and computer networks that communicate with each other. The Internet of Things (IoT) applies this concept to a network of linked everyday objects which can communicate, be read, recognized, located, and controlled via the internet or other communication networks.

The number and variety of IoT devices continues to grow. In the area of automation of homes and buildings, smart homes and buildings may have centralized control over nearly any device or system in the home or office, from appliances to home and business security systems. In the field of asset tracking, commercial businesses, hospitals, factories, and large organizations can utilize IoT devices to track the locations of various assets such as equipment, patients, products, vehicles, etc. In the area of health and wellness, doctors can remotely monitor patients' health, and laypeople can track the progress of fitness routines. In the area of personal safety, individuals can track their own location or the location of others, receive location-based notifications, and request security intervention or emergency services.

Traditional electronic monitoring systems include various devices configured to capture, store and transmit visual images and/or audio of a monitored area within the environment. In addition, these systems may include one or more sensors that are configured to detect one or more types of conditions or stimulus, microphones, sound sensors, lights, and speakers configured for audio communication or providing audible alerts. The various components of the electronic monitoring system interact with a cloud-based back-end system or control service that controls functions or provides various processing tasks for the components of the system. In addition, a user device, such as a PC or desktop computer, or a mobile device, such as a smart phone, a tablet or the like, may be used by a user to configure or communicate with the various components of the electronic monitoring system and the control service.

In order to set up an electronic monitoring system, a user establishes an account with a service provider through the service provider's webpage or using the service provider's application on a user device. In the account, the user adds or onboards the various components of the electronic monitoring system associated with the user's account by utilizing, for example, a pre-populated list of devices and simply following a series of on-screen instructions. The process ensures that only the owner of the account has access to the various components and data associated with the account.

The user may install an application from the service provider on a mobile device, such as a smart phone or tablet, to provide an interface to the electronic monitoring system. The application may allow the user to control various components of the electronic monitoring system using the mobile device. The user may, for example, turn on lights, lock or unlock a door, and/or activate or deactivate a siren in the monitoring system.

In some instances, the user may wish to provide access to the monitored area for a third party. The third party may be, for example, a delivery person, a maintenance worker, or an invited guest. The third party may arrive at the monitored area when the user is not present. Historically, it has been known that the third party may contact the user via a phone call, electronic mail, text message, or the like to let the user know that the third party has arrived. The user may then utilize the application to remotely control the various components of the electronic monitoring system as required to accommodate the third party.

However, requiring the third party to contact the user to remotely control the electronic monitoring system is not without certain drawbacks. In some instances, the third party may not have a predetermined time at which to arrive. The user would need to be accessible by the third party over an extended duration to be alerted to the arrival of the third party and to execute the needed operations for controlling the electronic monitoring system.

Therefore, it would be desirable to provide an improved system and method for remote activation of an electronic monitoring system.

Some electronic monitoring systems include a keypad, for example, mounted proximate a garage door or by another entry point for the monitored area. One option for providing remote access to the monitored area is for the user to create a temporary access code for the keypad. The user may create, for example, a delivery code or a guest code which may be entered on the keypad. The delivery code may be provided to a delivery driver and used to provide access to a limited space such as the garage. The guest code may be provided to a guest and allow the guest entry to the entire monitored area.

However, these alternate codes are not without certain drawbacks. The potential exists for a temporary user to not treat an alternate code as securely as a user may treat primary codes. The alternate code may be intentionally or unintentionally transferred to someone for whom the code was not intended. The new person would now have access to the monitored area via the temporary code without being granted permission by the user.

Therefore, it is also desirable to provide an improved system and method for providing secure activation of an electronic monitoring system.

SUMMARY OF THE INVENTION

In accordance with one embodiment of the present invention, a method for secure image code generation by an electronic monitoring system defines a desired interaction with the electronic monitoring system at a first device for the electronic monitoring system and generates multiple image codes corresponding to the desired interaction with the electronic monitoring system. The image codes are transmitted to a second device, and each of the image codes is shown on a display for the second device. Each of the image codes is scanned from the display of the second device with a camera present in the electronic monitoring system, and the desired interaction with the electronic monitoring system is activated responsive to scanning the image codes from the second device.

According to one aspect of the invention, a security image code is generated for transmission to the second device. The security image code is inserted into the multiple image codes and transmitted to the second device with the image codes. The security image code restricts activation of the desired interaction by the image codes.

According to another aspect of the invention, at least one restriction for the desired interaction is included in data encoded within the multiple image codes. The data from the image codes is decoded, and the desired interaction is activated according to the at least one restriction.

According to still other aspects of the invention, the multiple image codes are multiple QR codes, and at least a portion of the desired interaction is encoded within each of the QR codes. Alternately, the electronic monitoring system has defined multiple desired interactions. The multiple image codes includes a sequence of pictures, and each of the desired interactions is defined by a different sequence of pictures.

According to yet another aspect of the invention, the image codes are divided into a first portion and a second portion, where the first portion is transmitted to the second device. The second portion is transmitted to a third device. The first portion of the image codes is scanned from the second device and the second portion of image codes is scanned from the third device. The desired interaction is activated responsive to scanning both the first portion and the second portion of the image codes.

According to yet another aspect of the invention, the electronic monitoring system may include at least a first camera and a second camera. The process of scanning each of the plurality of image codes includes scanning at least a first portion of the image codes with the first camera and scanning at least a second portion of the image codes with the second camera. The electronic monitoring system may also include a base station operative to generate the plurality of image codes, transmit the plurality of image codes to the second device, receive each of the plurality of images code scanned from the camera, and activate the desired interaction.

According to other aspects of the invention, each of the image codes is generated in a predefined order. Each of the image codes is then displayed in the predefined order, and the desired interaction for activation is identified as a function of reading each of the image codes in order. Alternately, a sequence identifier is encoded in each of the image codes, and each of the image codes is displayed in a random sequence. The sequence identifier is decoded from each of the image codes, and the image codes are ordered according to the sequence identifier. The desired interaction for activation is then identified as a function of the image codes arranged in order.

According to another embodiment of the invention, a system for secure image code generation by an electronic monitoring system includes a base station, at least one monitoring device, and a controller. The base station is operative to control the electronic monitoring system, and the at least one monitoring device is in communication with the base station. The at least one monitoring device includes a camera to obtain images of a monitored area. The controller is operative to receive a request for a desired interaction with the electronic monitoring system from a first device in communication with the electronic monitoring system and to generate multiple image codes corresponding to the desired interaction with the electronic monitoring system. The controller transmits the image codes to a mobile device and then receives each of the image codes from the camera when the image codes are displayed on the mobile device while the mobile device is positioned in front of the camera. The controller activates the desired interaction with the electronic monitoring system responsive to receiving the image codes from the camera.

According to another aspect of the invention, the restriction may be a desired time for delivering the image code. The image codes corresponding to the desired interaction with the electronic monitoring system are generated at a first time prior to the desired time, and the image codes are transmitted to the mobile device at the desired time. Optionally, the restriction may be a desired position for the mobile device. The controller is further operative to obtain a present position from the mobile device, and the image codes are transmitted to the mobile device when the present position of the mobile device corresponds to the desired position.

According to still another aspect of the invention the system includes a backend system in communication with the base station, wherein the controller is executing in the backend system to generate the plurality of image codes and to transmit the plurality of image codes to the mobile device.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE DRAWINGS

Figure 1:
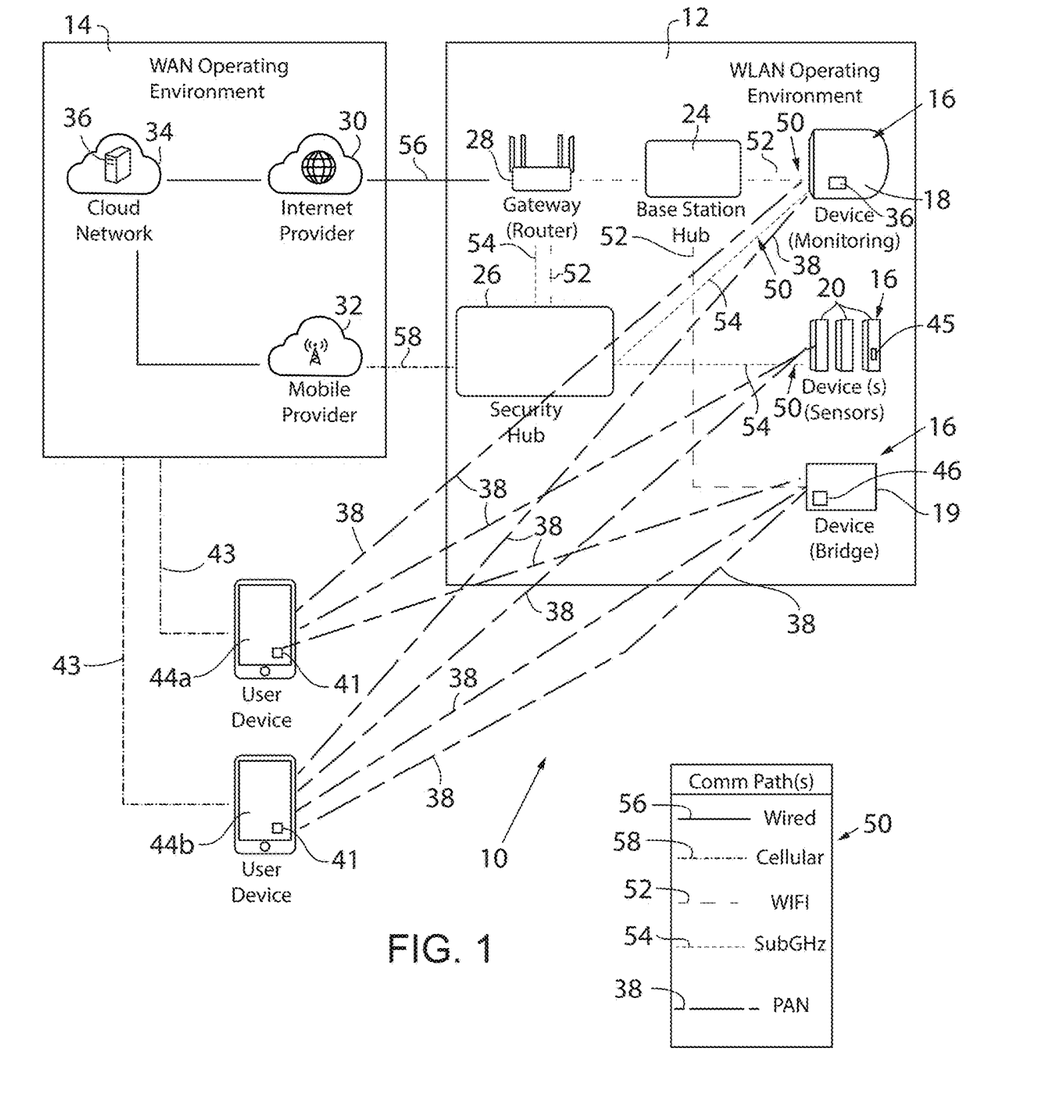
FIG. 1 is a block diagram of a system for electronic monitoring in accordance with one embodiment of the present invention.

Referring to FIG. 1, an electronic monitoring system 10 in accordance with an aspect of the present invention is generally shown. Electronic monitoring system 10 is implemented in a wireless communication operating environment. For example, wireless communication may be implemented by a WLAN (wireless local area network) operating environment (WLAN 12) or by communications technology on a personal area network (PAN) between the various components of electronic monitoring system 10 and/or one or more user devices 44, as hereinafter described. As mentioned above, communications may occur using Bluetooth® technology, but may also occur using Zigbee® or another short-range protocol. The term "PAN" should be understood to encompass all such communication technologies and protocols.

In the depicted embodiment, WLAN 12 is communicatively connected to a WAN (wide area network) operating environment, designated by the reference numeral 14. Within WLAN 12, various peripheral devices, also known as "client devices" 16, such as monitoring devices 18, bridges 19 and sensors 20, are wirelessly networked to a base station or high frequency hub 24 which, in turn, communicates with the WAN 14 via a gateway hub shown as gateway router 28. Base station hub 24 and router 28 provide a high frequency connection to WAN 14. Base station hub 24 may be eliminated as a stand-alone module if its functionality is incorporated into the gateway router 28, in which case the router 28 also serves as a base station hub. The system may also include a security hub 26 that communicates with monitoring device(s) 18 and with the WAN 14 and provides a low frequency connection between the WAN 14 and monitoring devices 18. If present, the security hub 26 may also communicate with the router 28 or hub 24, such as through a high frequency communication path 52 and/or a low frequency communication path 54 to the router 28. The security hub 26 is also provided with the capability of providing a high frequency connection with monitoring devices 18.

Still referring to FIG. 1, gateway router 28 is typically implemented as a Wi-Fi hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to gateway router 28 and the gateway router's connection to WAN 14 through internet provider 30. Each of the internet provider 30 and mobile provider 32 allows the components of system 10 to interact with a backend system or control service that can control functions or provide various processing tasks of components of system 10, shown as a cloud-based backend control service system 34, which could be an Arlo SmartCloud™ system. The backend system, such as the cloud-based control service system 34 includes at least one cloud-based server 36, each of which includes at least a power supply, a system board, one or more CPUs, memory, storage, such as a sharable database, and a network interface. The at least one cloud-based server 36 typically provides, for example, cloud-base onboarding capabilities for peripheral client devices 16, cloud storage of data, for example events, AI (artificial intelligence) based processing such as computer vision, and system access to emergency services.

Figure 2:
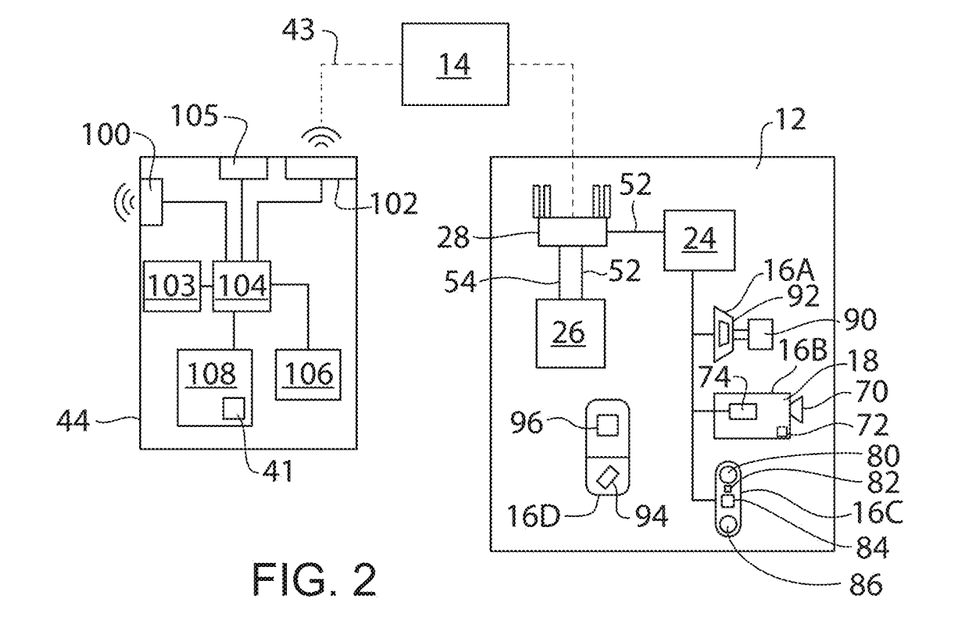
FIG. 2 is a partial block diagram representation of the system of FIG. 1.

As noted above, the client devices 16 of electronic monitoring system 10 may include one or more monitoring devices 18 that are mounted to face toward respective areas being monitored, such as around a building or other structure or area. Monitoring devices 18 may perform a variety of monitoring, sensing, and communicating functions. With reference also to FIG. 2, each monitoring device 18 may include a camera 70 and/or a microphone 72 to obtain video and/or audio data from an area being monitored. The monitoring device 18 includes firmware stored in non-volatile memory thereon and a control circuit 74 to execute the firmware. As is conventional, the firmware acts as the monitoring device's complete operating system, performing all control, monitoring and data manipulation functions. The control circuit 74 receives the feedback signals from the camera 70 and/or microphone 72 and transmits data to the base station hub 24 and/or the security hub 26. Monitoring may also be incorporated into other client devices. A doorbell 16C, for example, may include a camera 80 and/or microphone 82 included within the doorbell. The doorbell 16C includes firmware stored in non-volatile memory thereon and a control circuit 84 to execute the firmware. The control circuit 84 receives a signal from a button 86 on the doorbell as is conventional for signaling the presence of a person at the door, but the control circuit 84 also receives the feedback signals from the camera 80 and/or microphone 82 and transmits data to the base station hub 24 and/or the security hub 26.

The system 10 may also include device(s) and system(s) that perform functions other than monitoring. Such devices include smart home devices such as HVAC control systems and other components. FIG. 2 illustrates two such devices as a floodlight 16A and an electronic door lock 16D. The floodlight 16A includes a lamp 90 to illuminate a desired area and a control circuit. Firmware is stored in non-volatile memory firmware on the floodlight 16A. The control circuit 92 executes the firmware acting as the floodlight's complete operating system, performing all control, monitoring and data manipulation functions. The electronic door lock 16D includes a lock portion 94, which may be manually operated or automatically operated by a motor within the lock portion, and a control circuit 96. Firmware is stored in non-volatile memory firmware on the electronic door lock 16D. The control circuit 96 executes the firmware acting as the electronic door lock's complete operating system, performing all control, monitoring and data manipulation functions. Additional devices 16 could include one-touch type communication devices such as panic buttons and other communication buttons. One such communication device is marketed under Arlo Technologies, Inc. of Carlsbad, California under the brand name ARLO SAFE™. Although the illustrated devices 16A and 16D do not include a camera or microphone, some embodiments may include a camera and/or microphone. As such, all of the devices 16 and systems can be considered "monitoring devices" for purposes of the present discussion. Devices that communicate using LE protocols such as Bluetooth® can be considered "LE devices".

As indicated above, one monitoring device may include an imaging device, such as a video camera 70, that is configured to capture and store visual images or video of the monitored area within the environment, e.g., an Arlo® camera available from Arlo Technologies, Inc. of Carlsbad, California. In addition to containing a camera 70, the monitoring device 18 may also include one or more sensors configured to detect one or more types of conditions or stimuli, for example, motion, opening or closing events of doors or windows, the presence of smoke, carbon monoxide, water leaks, and temperature changes. Instead of, or in addition to, containing sensors, the monitoring device 18 may have audio device(s) such as microphones 72, sound sensors, and speakers configured for audio communication or providing audible alerts. Other types of monitoring devices 18 may have some combination of sensors 20 and/or audio devices without having imaging capability. One such device is Arlo Chime™ which has only audio capabilities. Sensors 20 or other monitoring devices 18 also may be incorporated into form factors of other house or building accessories, such as doorbells 16C, floodlights 16A, etc.

In order to allow for low and high frequency communication on WLAN 12, it is contemplated for monitoring devices 18 to have two radios operating at different frequencies. A first, "primary" radio operates at a first frequency, typically at a relatively high frequency, typically of 2.4 GHz to 5 GHZ, during periods of normal conductivity to perform monitoring and data capture functions such as video capture and transmission, sound transmission, motion sensing, etc. The second or "secondary radio" operates at a second frequency that is immune to, or at least resistant to, signals that typically jam other signals over the first frequency. The second frequency may be of considerably lower frequency in the sub-GHz or even RF range and may have a longer range than the primary radio. It is intended for the secondary radio to be operable when communications over the primary communication path are disrupted in order to permit the continued operation of monitoring devices 18, as well as to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each monitoring device 18 to include Bluetooth® or any PAN communications module 35 designated for wireless communication. As is known, module 35 allows monitoring devices 18 to communicate directly with one or more user devices 44 over a wireless Personal Area Network (PAN) via one or more PAN communication protocols such as Bluetooth®, Zigbee®, Z-Wave™, and MQTT™ Likewise, sensors 20 may similarly include Bluetooth® or any PAN communications module 45 to allow sensor 20 to communicate directly with one or more user devices 44 over a wireless Personal Area Network (PAN) 38 using one or more PAN communication protocols.

One or more user devices 44, such as a mobile device, smart phone, tablet, laptop, or PC, may communicate with various components of the electronic monitoring system 10. It can be understood that user devices 44 may communicate with the various components of electronic monitoring system 10 utilizing WLAN 12, WAN 14 and/or PAN 38 to provide an interface through which a user may interact with electronic monitoring system 10, including client devices 16, the base station hub 24, the security hub 26, and/or the gateway 28. With reference also to FIG. 2, the user device 44 may include multiple communication modules, including a PAN communications module 100 designated for wireless communication using low energy "LE" protocols. The PAN communications module 100 may be a Bluetooth® module allowing the user device 44 to communicate with other user devices 44, the bridge 19, client devices 16 or various other components in the monitoring system 10. Furthermore, in those embodiments of the user device 44, in which the user device 44 is a mobile device, smart phone, tablet or the like, the user device may include a cellular communications module 102 configured for cellular communication. The user device 44 may communicate with the WAN 14 over a cellular communication path 43 between the user device 44 and the mobile provider 32. Accordingly, through communication with the mobile provider 32, each user device 44 may form a communication pathway with the at least one cloud-based server 36 of the cloud-based control service system 34. Alternatively, when operating within WLAN 12, the cellular equipped user device 44 may alternatively communicate with the WAN 14 via the cellular communication path 43 or the gateway router 28 in communication with the internet provider 30. Whether through the Wi-Fi connection to the gateway router 28 or its respective internet provider 30, the user device 44 is configured to form a communication pathway with the cloud-based server 36.

The user device 44 may also include a position information interface 105. The position information interface 105 is in communication with one or more external sources to obtain position information for the device. According to one aspect of the invention, the position information interface 105 is in communication with multiple local substations, such as cellular towers. Each cellular tower has knowledge of its location either via data stored at the tower or via communication with a satellite positioning service. The user device 44 determines its distance from each of the local substations and receives the location data for the local substation. Using the position data for each local substation and triangulation, the user device 44 determines its present location. According to another aspect of the invention, the user device 44 may be in direct communication with the satellite positioning service. The satellite position service may be, for example, the Global Positioning System (GPS), Galileo, or the like, and directly provide information to the user device 44 of the present location of the device.

Each user device 44 includes memory 106 with an operating system and applications stored therein. A processor 104 is provided to execute the applications and to send and receive data from the communications modules 100, 102. A clock circuit 103 is illustrated in communication with the processor 104. The clock circuit 103 maintains a real-time value of the present time. Optionally, the clock circuit 103 may be a module executing on the processor 104. Each user device 44 further includes a user interface 108. The user interface 108 may include a microphone to receive audio from a user, a speaker to playback audio for the user, a video display system that typically includes a touchscreen to both display video data to and receive input from the user. Each user device may include an application stored in memory 106 and executable by the processor 104 to interact with the system 10. One such application is the Arlo® Smart application, which is displayed on the user interface 108 and which includes at least one actuatable user input 41. In response to the information provided on the display of the one or more user devices 44, a user may actuate the at least one actuatable user input 41.

Referring to again FIG. 1, within WLAN 12, multiple communication paths 50 are defined that transmit data between the various components of system 10. Communication paths 50 include a default or primary communication path 52 providing communication between monitoring device 18 and the base station hub 24, and a fail-over or fallback secondary communication path 54 providing communication between monitoring device 18 and the security hub 26. Optionally, some of the monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the peripheral device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. If the security hub 26 and the associated secondary communication path 54 are not present, the sensors 20 may communicate directly with the base station hub 24 (if present, or the router 28 if the functionality of the base station hub is incorporated into the router) via the primary communication path 52. Primary communication path 52 also extends between bridge 19 and the base station hub 24, and secondary communication path 54 may provide for fail-over or fallback communication between bridge 19 and the security hub 26, if the security hub 26 is present. The controllers of bridges 19 may also provide a wireless communication path directly to the router 28.

As described, electronic monitoring system 10 is configured to implement a seamless Over-The-Air (OTA) communication environment for each client device 16 by implementing a communication path switching strategy as a function of the operational state of primary and/or secondary communication paths, as heretofore described. For example, each monitoring device 18 is configured to acquire data and to transmit the acquired data, or data obtained by processing the acquired data, to a respective hub 24 and/or 26 for further processing and/or further transmission to a server such as the server 36 of the cloud-based control service system 34 and/or the user device(s) 44. The server 36 or other computing components of system 10 or otherwise in the WLAN 12 or WAN 14 can include, or be coupled to, a microprocessor, a microcontroller or other programmable logic element (individually and collectively considered "a controller") configured to execute a program. The controller also may be contained in whole in the monitoring device 18, base station hub 24, security hub 26, and/or the WIFI hub or router 28. Alternatively, interconnected aspects of the controller and the programs executed by it could be distributed in various permutations within the monitoring device 18, the hubs 24 and 26, router 28, and the server 36. This program may be utilized in filtering, processing, categorizing, storing, recalling, and transmitting data received from the monitoring device 18 via the hubs 24 and 26, router 28, and server 36. Server 36 or another appropriate system device may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording.

Figure 3:
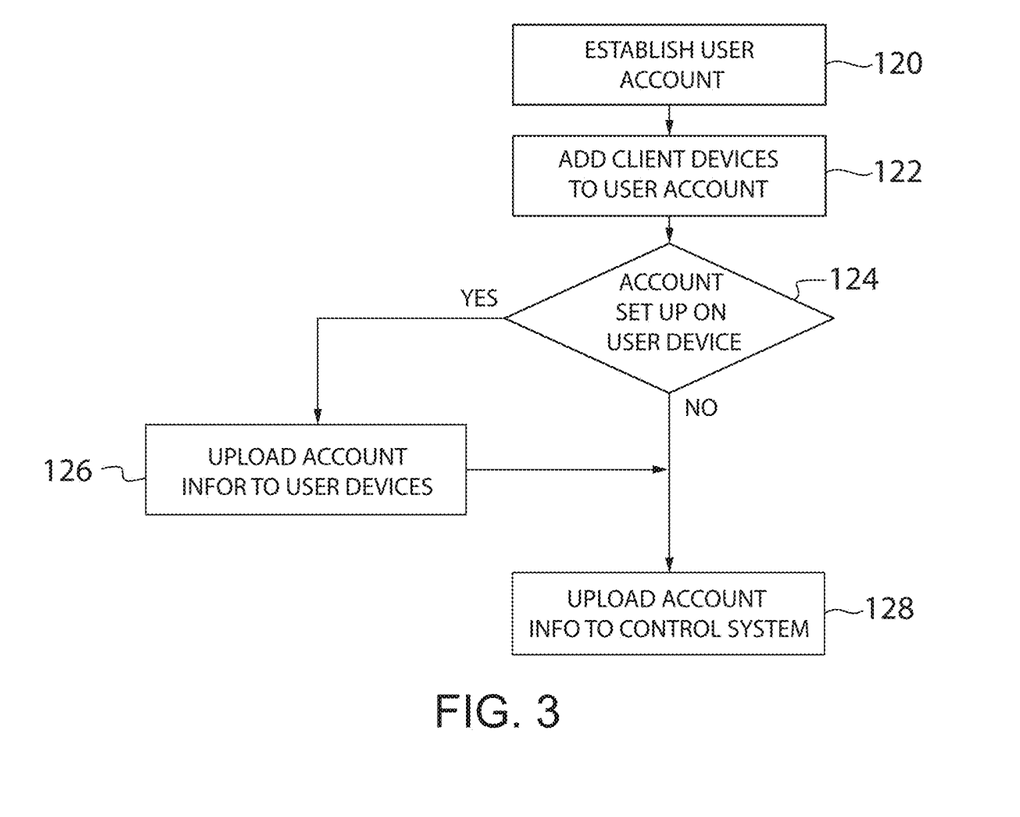
FIG. 3 is a flowchart showing a process for registering a device in the system according to one embodiment of the present invention.

Referring now to the flowchart of FIG. 3, in order to set up the electronic monitoring system 10 of the present embodiment, a user establishes an account with a service provider, e.g., Arlo, through the service provider's webpage or using the service provider's software application on user device 44, as shown in block 120. At block 122, a user may add or onboard various client devices 16 to the account previously established. The various client devices 16 may be monitoring devices 18, sensors 20, and/or the LE devices, such as the communication device 40, to the electronic monitoring system 10 associated with the user's account by utilizing, for example, a pre-populated list of devices and simply following a series of on-screen instructions. Once the various client devices 16 are added to the user's electronic monitoring system 10 through the user's account, information regarding client devices 16, e.g. serial numbers, is uploaded to cloud-based control service system 34, where the information is stored in the computer-readable memory associated with cloud-based backend control service system 34 for future reference. At block 124, the backend control service system 34 checks if the account was set up on one or more user devices 44. If a user utilized the service provider's webpage to onboard a user device 44, the cloud-based control service system 34 uploads the information regarding client devices 16, e.g. serial numbers 60, to the service provider's software application on user device 44, as shown in block 126. In either case, the cloud-based control service system 34 uploads the information regarding client devices 16, e.g. serial numbers 60, to the hub(s) 24, 26 in the control system 10, as shown in block 128.

Figure 4:
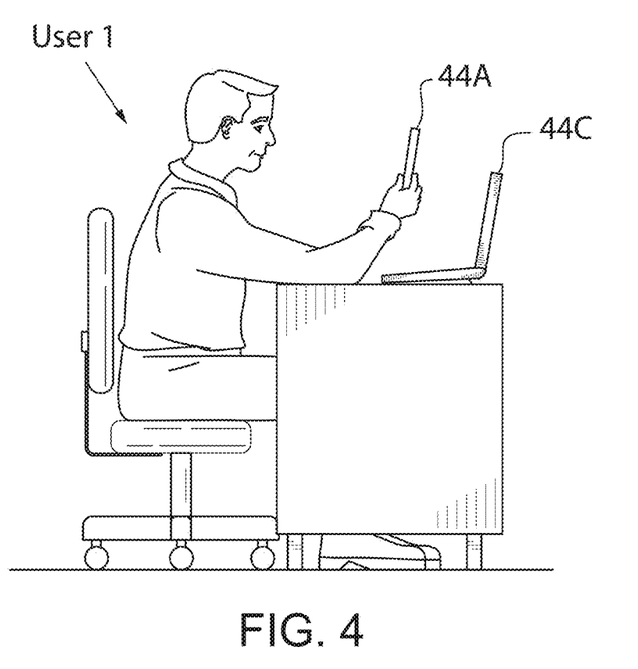
FIG. 4 is an exemplary environmental view of a user accessing the electronic monitoring system.

In operation, the electronic monitoring system disclosed herein provides an improved system and method for remote activation. With reference to FIG. 4, a first user accesses the electronic monitoring system 10 with a user device 44. A first user device 44A, as illustrated, is a mobile phone. An alternate user device 44C is illustrated as a laptop computing device. One or both of the user devices 44 include an installed application, such as the Arlo® Smart application, by which the user device interfaces with the electronic monitoring system 10. The first user may wish to grant access to another user to enter or interact with at least a portion of the area monitored by the electronic monitoring system 10, where the other user is not authorized to modify access or permission levels in the electronic monitoring system.

Figure 8:
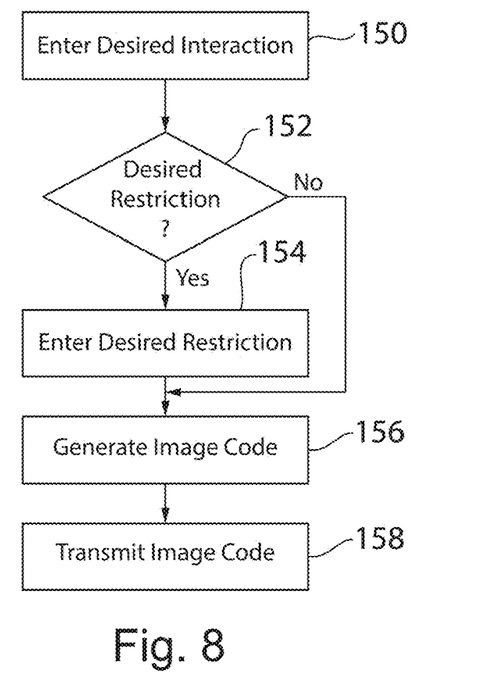
FIG. 8 is a flow diagram illustrating a process for generating an image code for use in initiating an instruction in the electronic monitoring system according to one aspect of the invention.

With reference also to FIG. 8, the first user enters a desired interaction for the electronic monitoring system, as shown in block 150. The desired interaction may be any interaction with one of the client devices 16, an interaction with the base station hub 24, security hub 26, gateway, or other interaction that the first user may be able to perform and wishes to delegate to another user. A few exemplary interactions may include, but are not limited to, obtaining a picture or video from a camera 70 present in the system 10, unlocking or locking a door, turning one of the client devices 16 on or off, and disabling or enabling an alarm.

The first user may wish to provide another user access for an extended period of time, such as for a house guest, or for a limited period of time, such as for a delivery or maintenance person. At block 152, the application executing on the user device 44 may prompt the first user to determine whether the first user wishes to limit the desired interaction. If such a restriction is desired, the first user enters the desired restriction to be associated with the desired interaction, as shown in block 154. The desired restriction may include, for example, a time limit during which the desired interaction may be performed. Optionally, the desired restriction may require a second user to be within a specific range of the monitored area, as indicated by a global positioning system, triangulation, or other position determining system present in a user device 44 associated with the other user.

At block 156, an image code is generated which provides the ability for remote activation of the desired interaction. As used herein, remote activation is not limited to an interaction occurring some distance from the monitored area. Rather, the desired interaction is typically intended to occur within the monitored area and with one of the client devices 16 previously registered with the electronic monitoring system 10. Rather, a remote activation is intended to indicate an activation occurring at a time and/or by a person remote from the first user requesting the desired interaction. The first user, being authorized to establish policies and procedures or to grant access to the electronic monitoring system would typically be able to directly activate or interact with the electronic monitoring system and not require such remote activation. The remote activation instead grants another user rights and, typically, temporary rights to interact with the electronic monitoring system.

Figure 6:
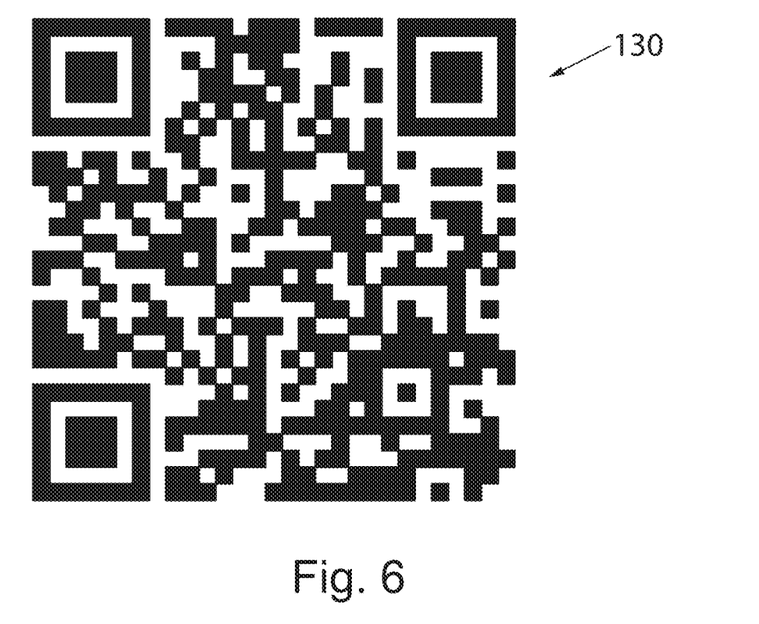
FIG. 6 is an exemplary image code for use in initiating an instruction in the electronic monitoring system according to one aspect of the invention.

With reference next to FIG. 6, one such image code to provide remote activation of the electronic monitoring system 10 is illustrated. The illustrated image code is a Quick-Response (QR) code 130. QR codes may be utilized to encode data in a two-dimensional matrix of pixels of a first color printed on a background of a second color. QR codes commonly include black pixels on a white background to provide high contrast between the two colors.

According to one aspect of the invention, the base station hub 24, the security hub 26, or a combination thereof is configured to generate the image code. In some instances, the security hub 26 provides a backup hub if the base station hub 24 is not functioning, allowing the security hub 26 to carryout functions of the base station hub. The application executing on the user device 44A or 44C is in communication with the base station 24, and the base station 24 receives the desired interaction and any desired restriction associated with the desired interaction. A QR code generation routine encodes the desired interaction and desired restriction into the QR code format and generates the QR code 130. For example, the QR code 130 of FIG. 6 includes a desired instruction to unlock a door and a desired restriction to permit the door to be unlocked between eight and ten o'clock in the morning (8-10 AM) on a Tuesday. It is contemplated that multiple desired interactions and multiple restrictions may also be encoded within the image code. For example, the desired instruction may include unlock a door, disable an alarm, and turn on a light within a building. The desired restriction may include not only a time window during which the code is active, but also include a requirement that a user device 44 for the user receiving the code be within one hundred feet of the monitored area. As will be discussed in more detail below, each of these desired interactions and desired restrictions will be subsequently read from the code to perform the desired interaction.

According to another aspect of the invention, the backend system 34 is configured to generate the image code. The user device 44A or 44C may communicate with the backend system 34 via the cellular communication path 43 or, alternately, may first communicate with the base station hub 24 or security hub 26 and, in turn, communicate with the backend system 34. The desired interaction and desired restriction or communicated to the backend system 34 and the backend system 34 executes the QR code generation routine. According to still another aspect of the invention, the base station hub 24, security hub 26, or backend system 34 may be in communication with a Software as a Service (SaaS) provider via the WAN environment 14, where the SaaS provider receives the desired interaction and desired restriction and generates the QR code 130.

Figure 7:
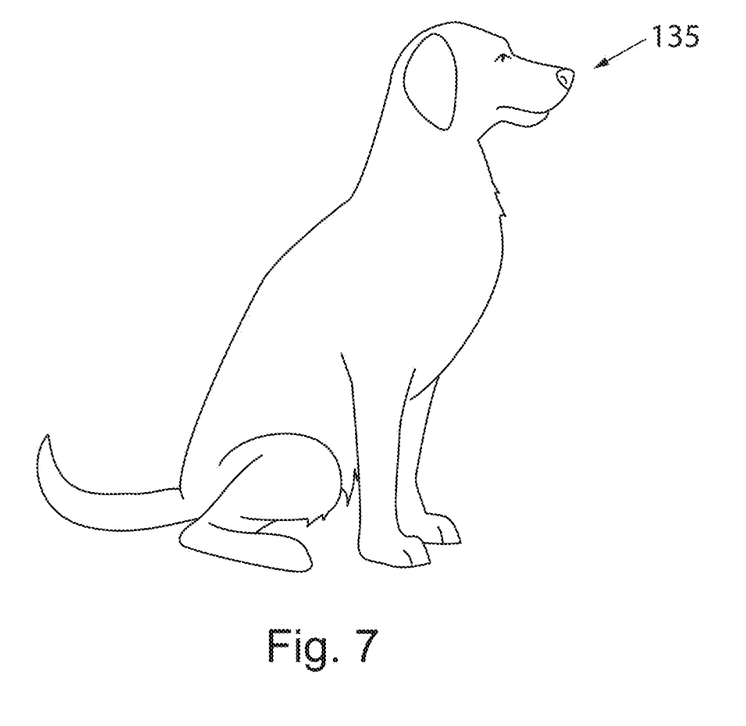
FIG. 7 is an exemplary image code for use in initiating an instruction in the electronic monitoring system according to one aspect of the invention.

With reference next to FIG. 7, another exemplary image code that is usable to provide remote activation of the electronic monitoring system 10 is illustrated. The alternate image code may be any suitable image to incorporate the information entered by the first user. Alternate images may include bar codes, pictograms, formatted text, encoded text, or other suitable images. According to the illustrated image, an animal, such as a dog, may serve as an alternate image code 135. The illustrated dog is shown in a sitting position, facing to the right. Alternate configurations of the dog may include, but are not limited to, standing, facing to the left, facing forward, facing backward, jumping, walking, running, having the mouth open, having a toy in the mouth, the tail in a raised or lowered orientation, or various combinations thereof. Different combinations of the dog may be used to identify different desired interactions and different restrictions. Optionally, different animals may be provided to signify different desired interactions, and different poses of the animal may be utilized to indicate different desired restrictions for the interaction. Again, the image code 135 may be generated by the base station hub 24, security hub 26, backend system 34 or by a SaaS provider according to various aspects of the invention.

Regardless of the format of the image code, whether a QR code 130, animal image code 135, or still other type of image code, once the code is generated, it may be transmitted to the intended user, as shown in block 158. According to one aspect of the invention, the restriction imposed on the image code 130, 135 may be a restriction on when the image code is transmitted to the second user. In this instance, the image code 130, 135 is stored in memory in the base station hub 24, security hub 26, or backend system 34 until the restriction on transmission is satisfied. Alternately, the image code 130, 135 may be transmitted immediately, however, the desired restriction on use is embedded in the code and enforced by the electronic monitoring system 10 when the image code is read.

Figure 5:
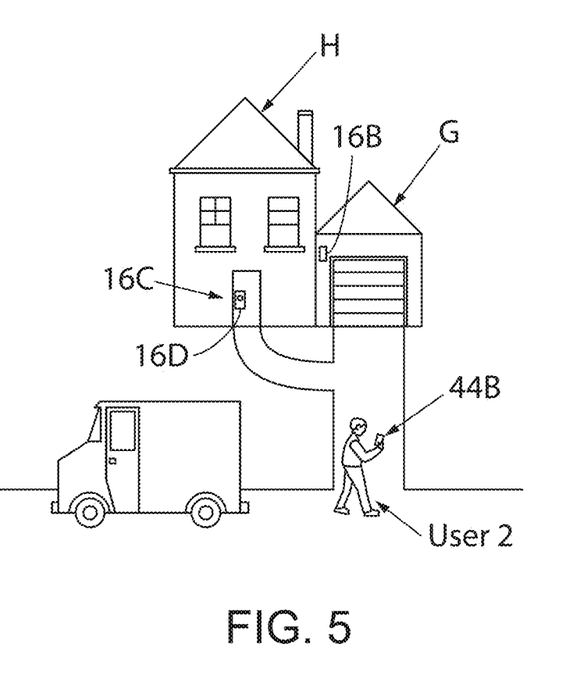
FIG. 5 is another exemplary environmental view of a user accessing the electronic monitoring system.
Figure 9:
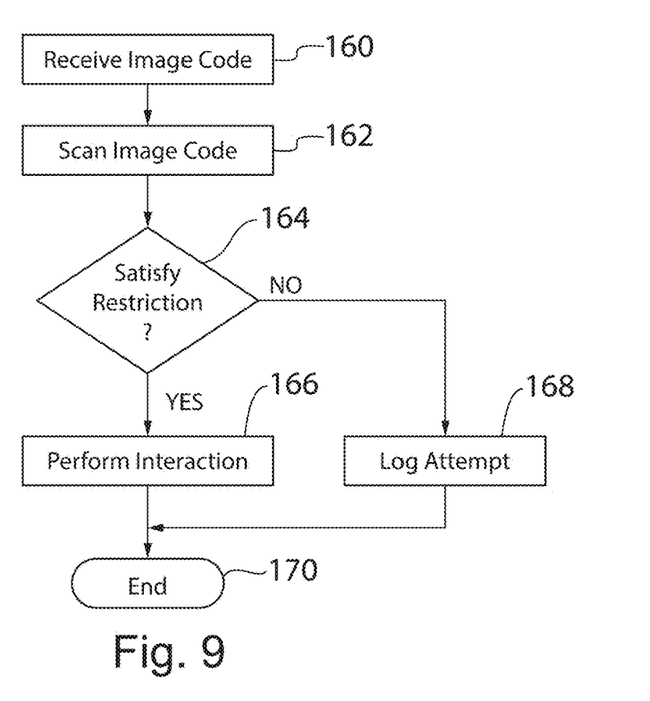
FIG. 9 is a flow diagram illustrating a process for initiating the instruction in the electronic monitoring system utilizing the image code generated in FIG. 8 according to one aspect of the invention.

Turning now to FIG. 9, an exemplary sequence of blocks is illustrated for reading the image code 130, 135 previously generated in order to perform the desired interaction. With reference also to FIG. 5, a second user has a second device 44B. According to one aspect of the invention, the second device 44B is in communication with the electronic monitoring system 10. The second device 44B may also include an installed application, such as the Arlo® Smart application, by which the user device interfaces with the electronic monitoring system. According to an exemplary application, a friend or relative is staying as a houseguest, and the first user, who is the owner of the house previously instructed the friend or relative to also install the application. According to another exemplary application, a delivery driver or maintenance person who regularly visits the monitored area may install the application. In these applications, the electronic monitoring system may communicate with the second device 44B, for example, to obtain a present location of the device. This present location of the second device 44B may be one of the restrictions imposed upon an image code. According to another aspect of the invention, the second user and the second device 44B do not have an application installed and are unable to communicate directly with the electronic monitoring system 10. Nevertheless, by using the image code 130, 135 provided by the first user, the second user is still able to interact with the electronic monitoring system.

As shown in block 160, the second device 44B receives the image code 130, 135 from the first user. As previously discussed, the image code 130, 135 may be transmitted to the second user upon generation. Alternately, the image code 130, 135 may be transmitted to the second user at a predefined time or upon the second user arriving at the monitored area. The image code 130, 135 need not be transmitted directly from the electronic monitoring system. Rather, the image code 130, 135 may be generated at the request of the first user and, for example, attached to an email, text message, or other communication between the first user and the second user. Once the image code 130, 135 is present on the second device 44B, the second user presents the image code 130, 135 to the electronic monitoring system for scanning. As discussed above, a number of the client devices 16 may include cameras. According to the environment illustrated in FIG. 5, a security camera 16B is mounted on the garage, G, and a doorbell 16C with a camera 80 is mounted on the house, H, next to the door. The second user, has the image code 130, 135 present on the display of the second device 44B and holds the second device 44B in the field of view of the security camera 16B, the doorbell 16C, or a combination thereof.

One or more of the cameras 70, 80 in the electronic monitoring system 10 are used to scan the image code as shown in block 162. One potential restriction for executing the desired interaction is identifying a particular camera 70, 80 at which the image code 130, 135 is to be scanned. For example, the second user may be required to scan the image code 130, 135 at the camera 80 within the doorbell 16C. Optionally, the second user may be required to scan the image code 130, 135 at multiple cameras and even present the image code in a predefined sequence before the multiple cameras.

Upon scanning the image code 130, 135, the data for the desired interaction and any restrictions on performing the desired interaction are decoded from the image code 130, 135. The client device 16 performing the scan may further include an application to decode the image. Thus, the doorbell 16C, camera 16B, or other device may first process the image code 130, 135 to extract the data encoded therein and then pass the data to the base station hub 24, security hub 26 or backend system 34. Optionally, the client device 16 scanning the image code may transmit a copy of the image code directly to the base station hub 24, security hub 26 or backend system 34 where the data is extracted. As noted in blocks 164 and 166, if the desired restriction(s) on performing the desired interaction are satisfied, the electronic monitoring system 10 will proceed to perform the desired interaction. If, however, one or more of the restrictions are not satisfied, the electronic monitoring system 10 may log the attempt to execute the desired interaction, as shown in block 168, and processing of the image code 130, 135 will exit as noted in block 170.

According to another aspect of the present invention, the system and method for providing image based contactless instructions further provides secure activation of an electronic monitoring system 10. Because the desired interactions are initiated by an image, an unauthorized user obtaining a copy of the image may be able to initiate the desired interaction. As discussed above, a desired restriction may be provided with the desired interaction and encoded within the data of the image code 130, 135. This restriction provides an initial level of security for preventing an unauthorized user from using a copy of the image code. However, as noted above, some restrictions may be time based. An unauthorized user having a copy of the image code 130, 135 may still utilize the image code within the time window. Other restrictions may be position-based. A potential exists for another user within range of the base station hub 24 to take actions to provide their present position to the hub 24 in order to receive position-based image codes. Thus, the present invention contemplates additional blocks to be implemented for secure generation and use of image codes to initiate a desired interaction in the electronic monitoring system 10.

Figure 10A:
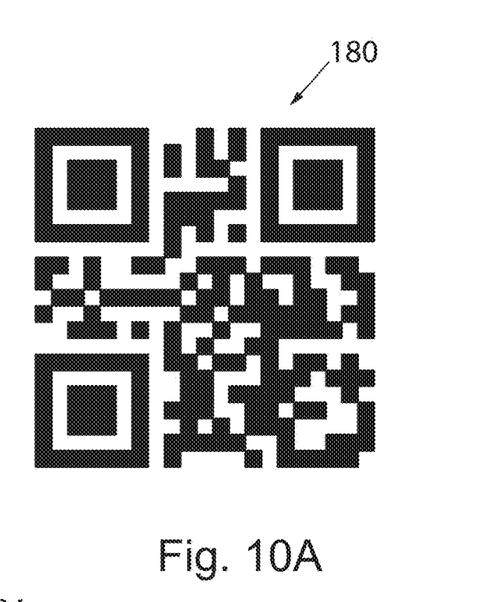
FIG. 10A is a first image code corresponding to a series of image codes in which the series of image codes includes the desired instruction to be performed by the electronic monitoring system.
Figure 10B:
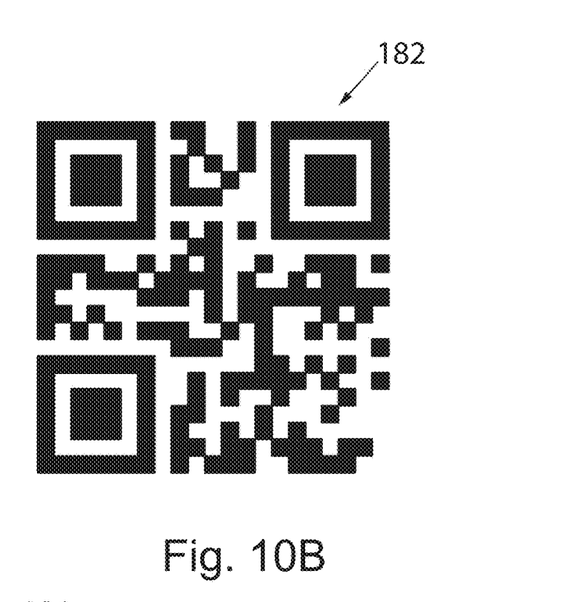
FIG. 10B is a second image code corresponding to the series of image codes begun in FIG. 10A in which the series of image codes includes the desired instruction to be performed by the electronic monitoring system.
Figure 10C:
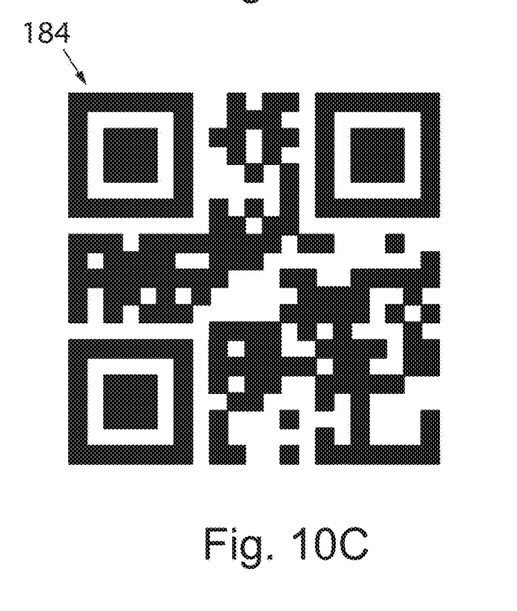
FIG. 10C is a third image code corresponding to the series of image codes begun in FIG. 10A in which the series of image codes includes the desired instruction to be performed by the electronic monitoring system.
Figure 10D:
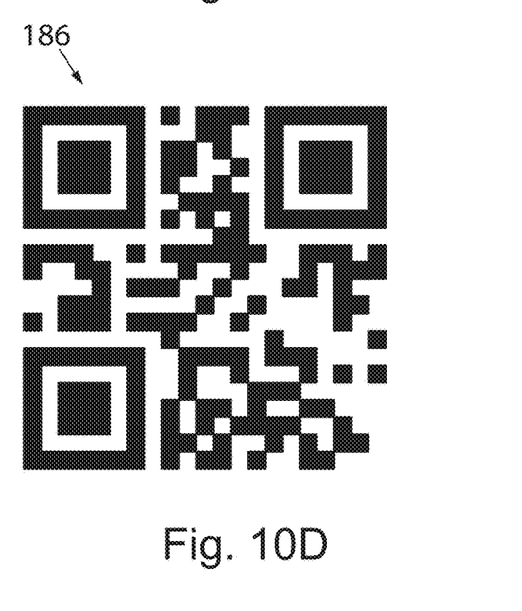
FIG. 10D is a fourth image code corresponding to the series of image codes begun in FIG. 10A in which the series of image codes includes the desired instruction to be performed by the electronic monitoring system.

With reference next to FIGS. 10A-10D, a first embodiment of a smart image code is illustrated. Rather than generating a single image, multiple images corresponding to the desired interaction may be generated. As discussed above with respect to FIG. 6, a QR code may be encoded to include a desired instruction to unlock a door and a desired restriction to permit the door to be unlocked between eight and ten o'clock in the morning (8-10 AM) on a Tuesday. In FIGS. 10A-10D the desired interaction and the desired restriction are each broken into multiple parts and encoded in separate QR codes. FIG. 10A illustrates a first QR code 180 which includes a first portion of the desired interaction and indicates only that that the desired interaction is to unlock. FIG. 10B illustrates a second QR code 182 which includes a second portion of the desired interaction and indicates further that the desired interaction is to take effect on the door. The combination of FIGS. 10A and 10B, therefore, provide the desired interaction as unlocking the door. Similarly, FIG. 10C illustrates a third QR code 184 which includes a first portion of the desired restriction and indicates that the interaction is limited to Tuesday. FIG. 10D illustrates a fourth QR code 186 which includes a second portion of the desired restriction and indicates that the interaction is limited to a time between eight and ten o'clock in the morning (8-10 AM). The combination of FIGS. 10C and 10D, therefore, provide the complete restriction as limiting the interaction to Tuesday between eight and ten o'clock in the morning. The combination of the four QR codes 180, 182, 184, 186 are referred to herein as a smart QR code and correspond to an image code having multiple images each containing a portion of the encoded data. Although illustrated in four image codes, it is contemplated that any number of image codes from two or more may be utilized to generate a smart image code.

The smart image code may be generated in response to an indication of a desired interaction by a user of the electronic monitoring system. Each of the QR codes 180, 182, 184, 186 are transmitted to a second device 44b to provide another user with the desired interaction. Rather than displaying a single image code 130, 135, the second device 44b displays each of the image codes within the smart image code. At least one of the cameras 70, 80 in the electronic monitoring system 10 are used to scan the smart QR code. Each of the images are transmitted to the base station hub 24, security hub 26, and/or the backend system 34 responsible for decoding data from the images and identifying the desired interaction. According to one aspect of the invention, the smart QR code includes data encoded in a desired sequence. Each QR code 180, 182, 184, 186 is displayed sequentially in a predefined order from the first image to the last image in the desired sequence. The controller responsible for decoding data and compiling the data to identify a desired interaction receives the images in sequence and is able to compile the data to generate the desired interaction. According to another aspect of the invention, the QR codes may each have a sequence identifier encoded into the image. The sequence identifier may be embedded with the portion of the desired interaction and/or the desired restriction that is also encoded into the QR code. The second device 44b may be configured to display each of the QR codes 180, 182, 184, 186 in a random sequence. The controller responsible for decoding data decodes both the sequence identifier and the portion of the desired interaction and/or the desired restriction encoded within the image. The controller is then able to put the QR codes or the portions of data extracted from each QR code in order according to the sequence identifiers. The data from each of the QR codes may then be combined in the proper order to identify the desired interaction and/or the desired restriction encoded within the smart QR code.

A further feature of the display sequence may require display of the image codes in a predefined time sequence. A fixed time delay between each image may be defined. Optionally, a random and/or varying time delay between displaying each image may be defined, where the time delay is encoded within the image code. The controller responsible for decoding the data may decode the time delay and verify that the next image code is received with the proper time delay. Including a required time sequence may further prevent playback of multiple images by an unauthorized user who obtains copies of each image in a smart code.

According to another embodiment of the smart image code, the smart image code may be generated using multiple images other than QR codes. As discussed above with respect to FIG. 7, other images, such as animals, may be utilized to represent a desired interaction. In the same manner as discussed above with respect to multiple QR codes 180, 182, 184, 186 being used to each encode a portion of the data for a desired interaction and/or a desired restriction, multiple images other than QR codes may be utilized where the sequence of images defines the encoded data. For ease of description, the dog 135 illustrated in FIG. 7 will be discussed as an example. A series of image codes may depict the dog transitioning from a sitting position to a standing position. The same series of image codes may depict the dog transitioning from the standing position to the sitting position. The order in which the images are displayed on the second device 44b may correspond, for example, either to enabling a client device 16 or disabling the client device. Different animals may correspond to different client devices 16. Optionally, multiple image sequences depicting different actions by the same animal may correspond to enabling/disabling different client devices or to initiating different interactions from the same client device. The electronic monitoring system 10 may have multiple defined interactions from which a desired interaction is selected. A different series of image codes corresponds to each of the desired interactions. The correct series of images is generated when a user enters a desired interaction and/or a desired restriction at a first device in communication with the electronic monitoring system 10.

Utilizing multiple images to encode data and to create the smart QR code or smart image coed makes the smart code more secure by preventing an unauthorized user from using a screen capture or photo of a display on the second device 44b to obtain a single image code without permission. However, the potential still exists for an unauthorized user to capture a video of the sequence of codes in a smart code. Therefore, still additional features may be included in the smart code to further improve security of the smart code.

According to another feature of the invention, the smart code may be divided into multiple portions. For ease of discussion, a first QR code 180 and a second QR code 182 may be included in a first portion, and a third QR code 184 and a fourth QR code 186 may be include in a second portion. The smart code may have any number of portions and each portion may include any number of images. In order to improve security of the smart code, the smart code may be provided to the second device 44b with further instructions on how to use the smart code. The instructions may tell a user to present the second device 44b before two different cameras within the electronic monitoring system 10. For instance, the camera 80 on the doorbell 16C may be a first camera, and a camera 16B mounted on the garage, G, may be a second camera. The user may be instructed to show the first portion of the smart code to the camera on the garage, G, as the user approaches the door, and then show the second portion of the smart code to the camera 80 in the doorbell 16C when the user reaches the door. In a first aspect of the invention, the smart code may be divided into two smart codes. The first portion of the images are stored in the first smart code, and the second portion of the images are stored in the second smart code. The user may then present either the first smart code or the second smart code to the appropriate camera 70, 80. Further, the user may be instructed to present the first and second smart codes to specific cameras in sequence. Thus, even if an unauthorized user were to obtain a video sequence of one or both of the smart codes, the unauthorized user would not have the instructions on which camera or in which order to present the smart codes.

According to another aspect of the invention, both portions of the smart code may remain in a single smart code. The user may still receive instructions regarding which camera 70, 80 is to scan the smart code and, potentially, a sequence in which the code is to be presented. If the second device 44b is in communication with the base station 24 or other controller for the electronic monitoring system 10, the base station may instruct the second device 44B to only display the first portion of the images when the user is present by the first camera and then display the second portion of the smart code when the second device 44B is present by the second camera. Thus, if an unauthorized user captured video of one portion of the smart code being displayed, only that portion of the smart code would be captured.

According to still another feature of the invention, the first portion of the smart code may be provided to a first additional user device and a second portion of the smart code may be provided to a second additional user device. In this manner two users and two additional devices 44b must be scanned by cameras 70, 80 in the electronic monitoring system 10. In this manner, if an unauthorized user is able to obtain a screen capture or a video capture of one portion of the smart code from one of the additional devices 44b, the unauthorized user would not obtain the entire smart code for a desired interaction.

According to still another feature of the invention, a security image may be generated in addition to the images for the smart code. The electronic monitoring system 10 may be configured to dynamically generate an image for inclusion with the smart code. The desired interaction and/or desired restriction may be entered by a user at a first time. The user may then schedule a time for delivery to the mobile device of the person intended to perform the desired interaction. The delivery time may be immediate or at a later time. When the controller transmits the resultant smart code for the desired interaction and/or desired restriction, an additional security image is generated. This security image may include, for example, a time at which the security image is generated, a random data sequence, or any other dynamic data to generate a unique image. The security image is transmitted with the other images in the smart code to the second user device 44b and must be scanned in conjunction with the other images in the smart code.

When the person performing the interaction scans the mobile device 44b with the smart code, the security image is scanned as well. The security image may be presented separately from the smart code or the security image may be inserted as one of the images in the smart code. The electronic monitoring system 10 recognizes the security image as a single use code, corresponding to the particular instance of the smart code, and only accepts the smart code from the first mobile device 44b presenting the smart code. Consequently, if an unauthorized user obtained screen captures or a video of the smart code, subsequent use of the smart code would not be permitted.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

We claim:

1. A method for secure image code generation by an electronic monitoring system, comprising:
defining a desired interaction with the electronic monitoring system at a first device for the electronic monitoring system;
generating a plurality of image codes corresponding to the desired interaction with the electronic monitoring system;
transmitting the plurality of image codes to a second device;
displaying each of the plurality of image codes on a display for the second device;
scanning each of the plurality of image codes from the display of the second device with a camera present in the electronic monitoring system; and
activating the desired interaction with the electronic monitoring system responsive to scanning the plurality of image codes from the second device.

2. The method of claim 1, further comprising:
generating a security image code for transmission to the second device;
inserting the security image code into the plurality of image codes; and
transmitting the security image code to the second device with the plurality of image codes, wherein the security image code restricts activation of the desired interaction by the plurality of image codes.

3. The method of claim 1, further comprising:
encoding data defining at least one restriction for the desired interaction within the plurality of image codes; and
decoding the data from the plurality of image codes, wherein the desired interaction is activated according to the at least one restriction.

4. The method of claim 1, wherein the plurality of image codes is a plurality of QR codes and wherein at least a portion of the desired interaction is encoded within each of the plurality of QR codes.

5. The method of claim 1, wherein:
the electronic monitoring system has defined a plurality of desired interactions;
the plurality of image codes is a sequence of pictures; and
each of the plurality of desired interactions is defined by a different sequence of pictures.

6. The method of claim 1, further comprising:
dividing the plurality of image codes into a first portion and a second portion, wherein the first portion is transmitted to the second device;
transmitting the second portion to a third device;
scanning the first portion of the plurality of image codes from the second device; and
scanning the second portion of the plurality of image codes from the third device, wherein the desired interaction is activated responsive to scanning both the first portion and the second portion of the image codes.

7. The method of claim 1, wherein:
the electronic monitoring system includes at least a first camera and a second camera, and
scanning each of the plurality of image codes includes scanning at least a first portion of the image codes with the first camera and scanning at least a second portion of the image codes with the second camera.

8. The method of claim 1, wherein:
each of the plurality of image codes is generated in a predefined order,
each of the plurality of image codes is displayed in the predefined order, and
the method further comprises identifying the desired interaction for activation as a function of reading each of the image codes in order.

9. The method of claim 1, further comprising:
encoding a sequence identifier in each of the plurality of image codes, wherein each of the plurality of image codes is displayed in a random sequence;
decoding the sequence identifier from each of the plurality of image codes;
ordering the plurality of image codes according to the sequence identifier; and
identifying the desired interaction for activation as a function of the image codes arranged in order.

10. The method of claim 1, wherein the electronic monitoring system includes a base station operative to generate the plurality of image codes, transmit the plurality of image codes to the second device, receive each of the plurality of images code scanned from the camera, and activate the desired interaction.

11. A system for secure image code generation by an electronic monitoring system, comprising:

a base station operative to control the electronic monitoring system;
at least one monitoring device in communication with the base station, the at least one monitoring device including a camera to obtain images of a monitored area; and
a controller operative to:
receive a request for a desired interaction with the electronic monitoring system from a first device in communication with the electronic monitoring system,
generate a plurality of image codes corresponding to the desired interaction with the electronic monitoring system,
transmit the plurality of image codes to a mobile device,
receive each of the plurality of image codes from the camera, wherein each of the plurality of image codes are displayed on the mobile device while the mobile device is positioned in front of the camera, and
activate the desired interaction with the electronic monitoring system responsive to receiving the plurality of image codes from the camera.

12. The system of claim 11, wherein the controller is further operative to:
generate a security image for transmission to the mobile device;
insert the security image code into the plurality of image codes; and
transmit the security image code to the mobile device with the plurality of image codes, wherein the security image code restricts activation of the desired interaction by the plurality of image codes.

13. The system of claim 11, wherein the controller is further operative to:
encode data defining at least one restriction for the desired interaction within the plurality of image codes; and
decode the data from the plurality of image codes received from the camera, wherein the desired interaction is activated according to the at least one restriction.

14. The system of claim 13, wherein:
the at least one restriction is a desired time for delivering the image code,
the plurality of image codes corresponding to the desired interaction with the electronic monitoring system are generated at a first time prior to the desired time, and
the plurality of image codes are transmitted to the mobile device at the desired time.

15. The system of claim 13, wherein:
the at least one restriction is a desired position for the mobile device,
the controller is further operative to obtain a present position from the mobile device, and
the plurality of image codes are transmitted to the mobile device when the present position of the mobile device corresponds to the desired position.

16. The system of claim 11 wherein the controller is further operative to:
divide the plurality of image codes into a first portion and a second portion, wherein the first portion is transmitted to the mobile device;
transmit the second portion to a second mobile device; and
receive both the first portion and the second portion of the plurality of image codes scanned by the camera, wherein the desired interaction is activated responsive to receiving both the first portion and the second portion of the image codes.

17. The system of claim 11, wherein:
the at least one monitoring device includes a first monitoring device with a first camera and a second monitoring device with a second camera,
a first portion of the image codes are received from the first camera, and
a second portion of the image codes are received from the second camera.

18. The system of claim 11, further comprising a backend system in communication with the base station, wherein the controller is executing in the backend system to generate the plurality of image codes and to transmit the plurality of image codes to the mobile device.

19. The system of claim 11, wherein the controller is executing in the base station.

20. The system of claim 11, wherein:
each of the plurality of image codes is generated in a predefined order,
each of the plurality of image codes is displayed on the mobile device in the predefined order, and
the controller is further operative to identify the desired interaction for activation as a function of reading each of the image codes in order.

* * * * *